No. 742,736. PATENTED OCT. 27, 1903.
M. PURCELL.
NOSE BAND FOR HORSES.
APPLICATION FILED JULY 16, 1903.
NO MODEL.

Witnesses
Edw Harrington Jr
Alfred H Hicks

Inventor
Malcolm Purcell.
by Higdon & Longan & Hopkins attys

No. 742,736.

Patented October 27, 1903.

UNITED STATES PATENT OFFICE.

MALCOLM PURCELL, OF ST. LOUIS, MISSOURI, ASSIGNOR OF ONE-HALF TO HENRY PFEFFLE, OF ST. LOUIS, MISSOURI.

NOSE-BAND FOR HORSES.

SPECIFICATION forming part of Letters Patent No. 742,736, dated October 27, 1903.

Application filed July 16, 1903. Serial No. 165,828. (No model.)

*To all whom it may concern:*

Be it known that I, MALCOLM PURCELL, a citizen of the United States, residing at St. Louis, State of Missouri, have invented certain new and useful Improvements in Nose-Bands for Horses, of which the following is a specification, containing a full, clear, and exact description, reference being had to the accompanying drawings, forming a part hereof.

My invention relates to an improved nose-band for horses, and has for its object to provide a nose-band which shall be readily adjustable and will securely surround and hold the nose of a horse without interfering with its breathing.

Figure 1:
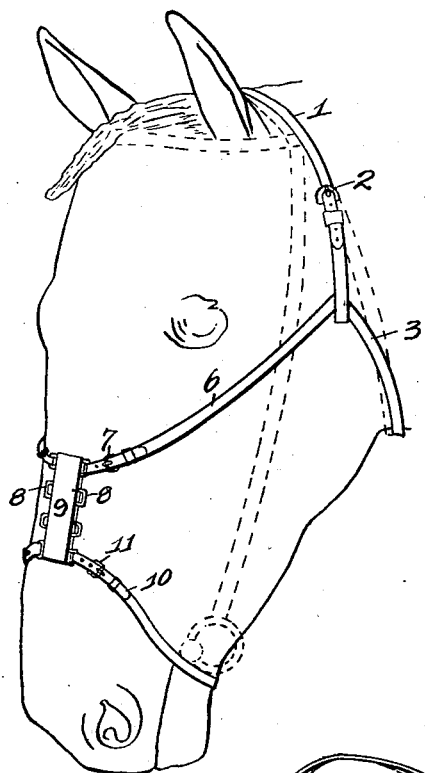
Figure 2:
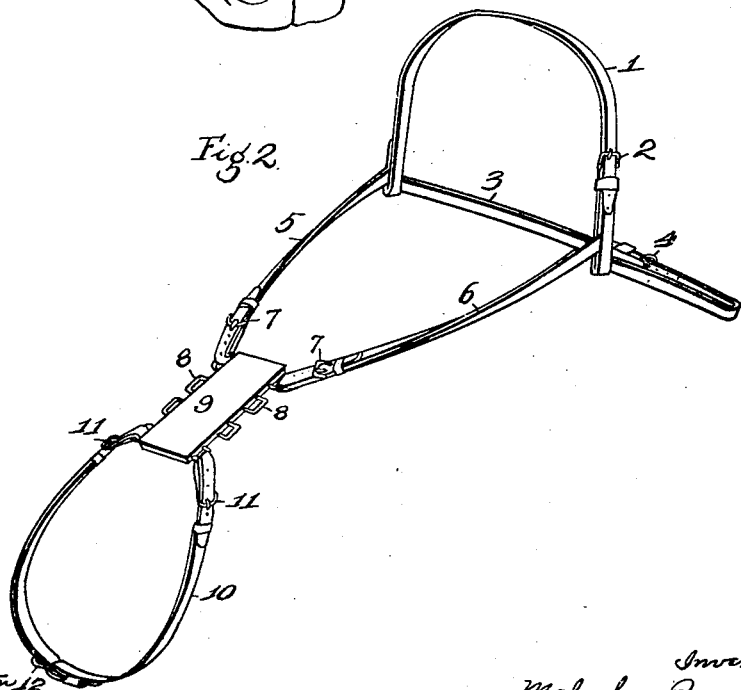

In the drawings, Figure 1 is a perspective view of a nose-band of my invention in position upon the head of a horse. Fig. 2 is a perspective view of the nose-band.

I am aware that heretofore nose-bands have been employed as part of or in connection with the harness or bridle of the harness, the general objects of such nose-band being to hold the jaws of the horse together, to prevent the tongue from lolling over the bit, and to restrain or correct wind-sucking; but in the devices employed for that purpose the location of the strap or straps encircling the nose has not been capable of adjustment to avoid interference with the nasal passages, and they have invariably resulted in obstruction of the breathing of the animal, to the detriment of its wind and speed. My invention is devised to overcome these defects and to place the encircling strap at a point where it will effectually hold the jaws of the animal together without placing any constriction upon its nasal passages.

Referring to the drawings, the numeral 1 indicates a strap doubled upon itself adapted to be placed over the head and back of the ears of a horse and adjustable by means of the buckle 2, to the lower extremities of which the adjustable band 3 is affixed, adapted to run beneath the throat of the horse and made adjustable by means of the buckle 4. The side straps 5 and 6 are fixed to the strap 1 near its lower extremities, are adapted to lie upon the sides of the horse's head, and are provided at their forward extremities with the buckles 7, so that they may be adjustably fastened to either of the loops 8 on the sides of the member 9, which is of the form shown in the drawings, flat and made of sole-leather or like material and of a sufficient width to cover the width of the bridge of the animal's nose. The nose-strap 10 is fastened to the loops 8, near the lower extremity of the member 9, by means of buckles 11, and is made adjustable upon itself by means of the buckle 12, and is adapted to surround the jaws of the horse below the bit.

I have thus provided a nose-band which effectually overcomes the objections to the prior nose-bands to which I have referred and which is capable of adjustment in each and all of its parts to adapt it to the head of a horse of any size.

Having thus described my invention, what I claim as new, and desire to have secured to me by the grant of Letters Patent, is—

1. A nose-band, consisting of a strap adapted to be placed over the head and back of the ears of a horse, an adjustable band fastened to the lower extremities of said strap and adapted to run beneath the throat of the horse, two side straps fixed to the first-mentioned strap near its lower extremities one upon each side of the horse's head, a flat member carried by the side straps and adapted to rest upon the bridge of the nose of the horse, and a nose-strap carried by the flat member and adapted to surround the jaws of the horse below the bit, substantially as described.

2. A nose-band, consisting of a strap adapted to be placed over the head and back of the ears of a horse, an adjustable band fastened to the lower extremities of said strap and adapted to run beneath the throat of the horse, two side straps fixed to the first-mentioned strap near its lower extremities one upon each side of the horse's head, a flat member carried by the side straps and adapted to rest upon the bridge of the nose of the horse, and a nose-strap carried by the flat member and adapted to surround the jaws of the horse below the bit, the flat member being provided with loops to permit the adjustment of the side straps and nose-strap, substantially as described.

In testimony whereof I have signed my name to this specification in presence of two subscribing witnesses.

MALCOLM PURCELL.

Witnesses:
ALFRED A. EICKS,
M. G. IRION.